Jan. 2, 1968
G. D. ARNOLD
3,360,868
METHOD OF DEHYDRATING WHOLE GRAIN
Filed Dec. 14, 1965
2 Sheets-Sheet 1
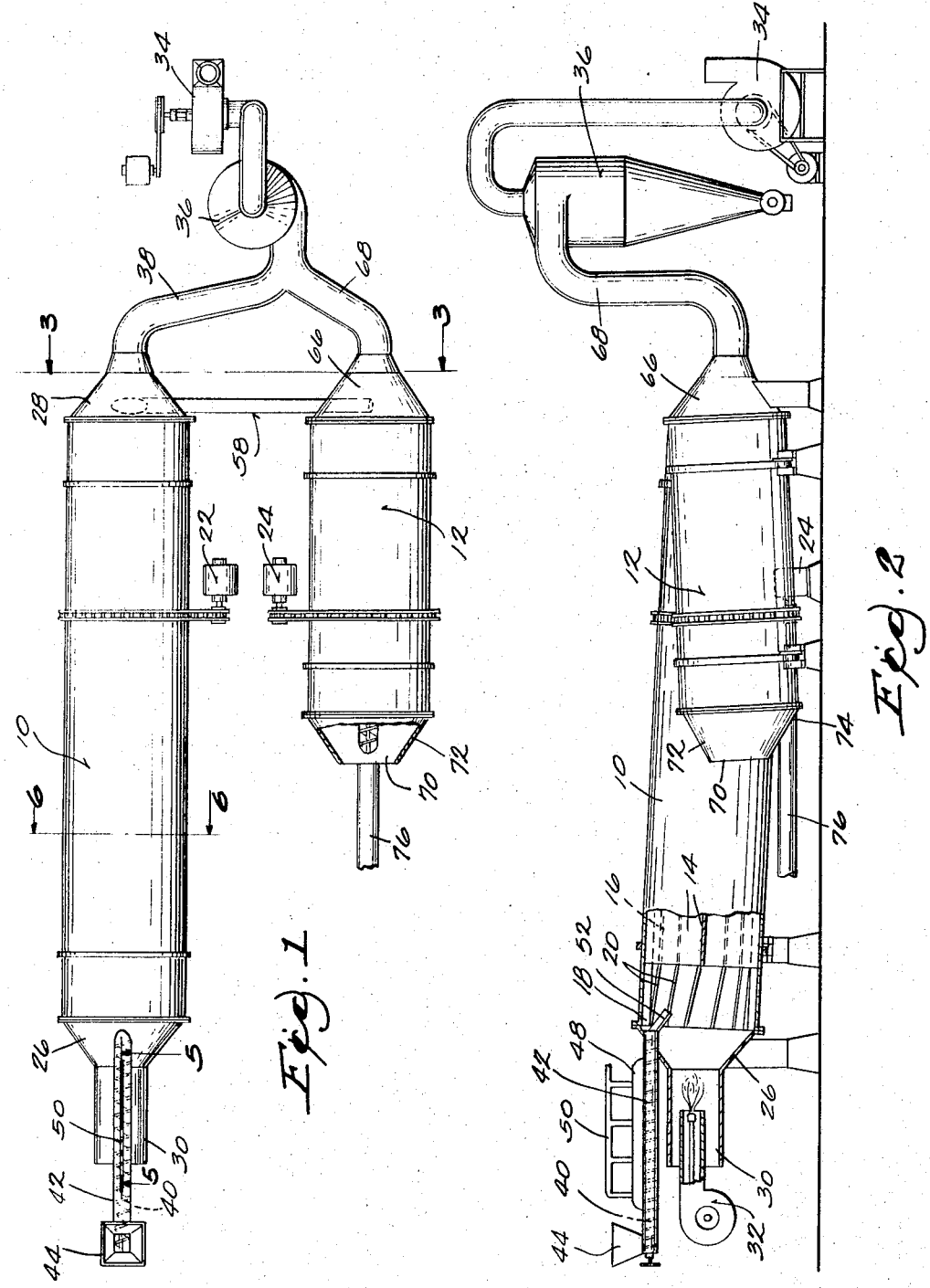
INVENTOR
GERALD D. ARNOLD
BY Wheeler, Wheeler + Wheeler
ATTORNEYS Jan. 2, 1968   G. D. ARNOLD   3,360,868
METHOD OF DEHYDRATING WHOLE GRAIN
Filed Dec. 14, 1965   2 Sheets-Sheet 2
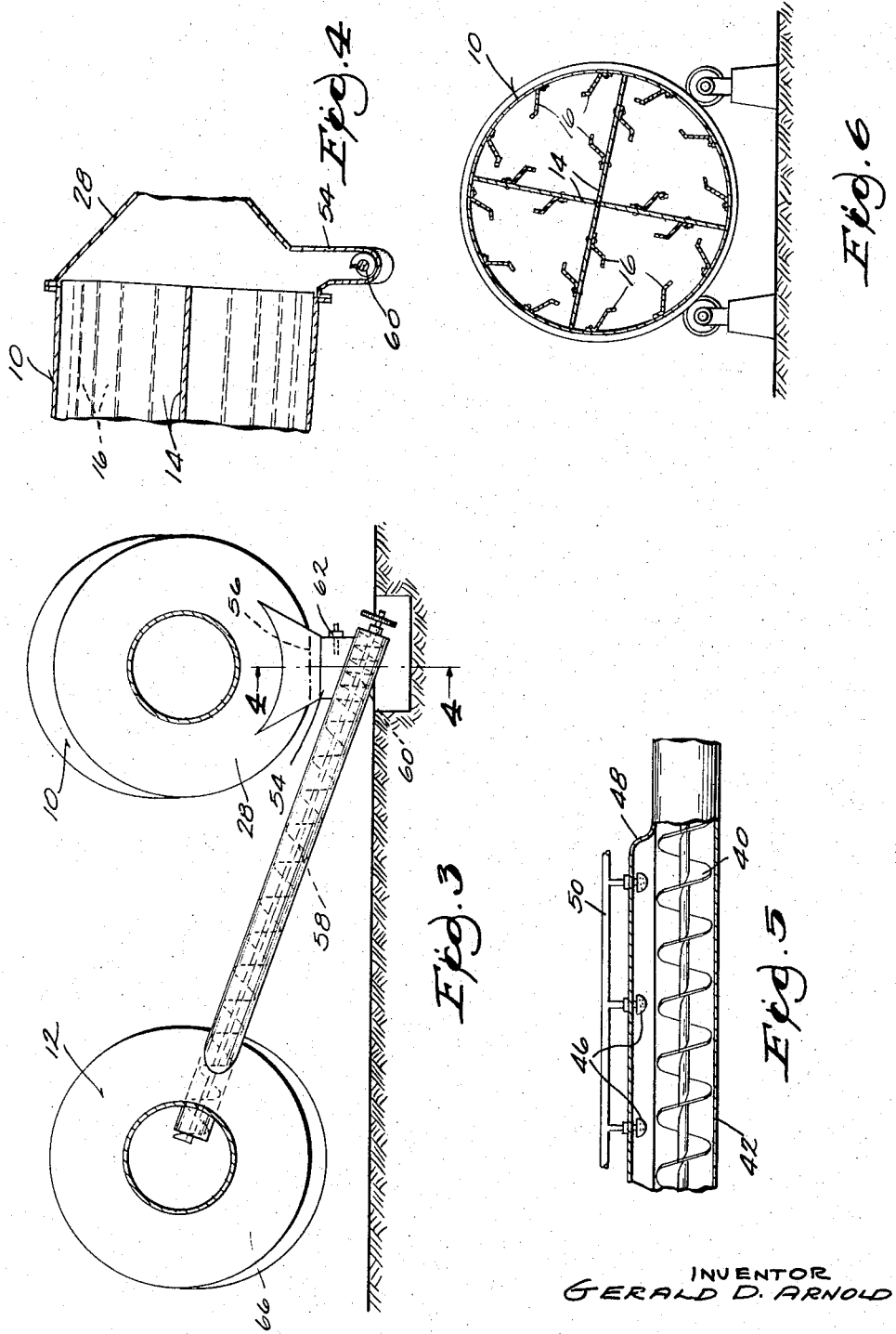
INVENTOR
GERALD D. ARNOLD
BY Wheeler, Wheeler + Wheeler
ATTORNEYS

United States Patent Office 3,360,868
Patented Jan. 2, 1968

3,360,868
METHOD OF DEHYDRATING WHOLE GRAIN
Gerald D. Arnold, Ettrick, Wis. 54627
Filed Dec. 14, 1965, Ser. No. 513,771
10 Claims. (Cl. 34—13)

This invention relates to a method of dehydrating whole grain.

The present application is a continuation in part of my application 332,098, filed Dec. 20, 1963, now abandoned.

It has ben difficult to preserve raw whole grain. Although the grain as harvested may appear to be dry, it almost invariably contains sufficient moisture so that it tends to spoil in storage. It is, therefore, conventional practice either to store grain in such manner that air can circulate about it or to dehydrate it artificially prior to storage. Usually it is placed in a column through which dehydrating gas passes.

Cracked grain is readily dried. However, everyday practices employed in artificial dehydration of whole grain too frequently result in heat damage to the grain. Damage starts to occur whenever the surface temperature of shelled corn, for example, exceeds 140 to 150 degrees F. Heat damage is readily apparent upon inspection of corn which has been heated to 160 degrees F. While other grains sustain damage at other temperatures, those given for corn will exemplify the invention.

The commercial value of shelled corn in particular depends upon two factors: The amount of starch which can be separated and recovered, and its freedom from checks or cracks. The amount of recoverable starch is the major factor in the millability score. The heat damage primarily involves reduction in recoverable starch.

The endosperm lies within a normally porous skin. Moisture within the endosperm can be driven out speedily by high temperatures. The present invention is based on my discovery of a method by which the outward flow of moisture through the normally porous skin from the endosperm can be effected speedily without damage.

If the skin is heated very much above atmospheric temperature, it ceases to be porous. This phenomenon is known as case hardening. The moisture flow outwardly is then inhibited. For lack of evaporation cooling, the entire kernel of grain exposed to hot dehydrating gases becomes overheated with resultant loss of starch content and cracking. In fact, the internal vapor pressure may and frequently does cause the kernel to crack open explosively and disintegrate. Checks or cracks are routinely found in artificially dehydrated grain and depreciate its value.

It is my discovery that if the entire surface of the kernel of grain is wet when the kernel is first exposed to the dehydrating temperature, the evaporation from the surface will keep the surface cool and prevent case hardening, the pores remaining open to permit initiation of outward flow of moisture from the interior. Heat from the dehydrating gases penetrates through the evaporation-cooled surface to expedite such outward flow of the natural interior moisture. The moisture from the interior thus replaces that initially placed artificially upon the surface of the kernel.

Continuing evaporation then causes the grain surface to remain reasonably cool and also keeps the interior below the temperature at which damage ensues. Thus, despite the use of dehydrating gases at temperatures which would otherwise damage the grain, the grain is uninjured and gives off its moisture quickly and as completely as may be desired. Grain dried in accordance with the present invention has unimpaired starch content and is normally entirely free of checks or cracks, being, in these respects, in sharp contrast with all other grain exposed to heated dehydrating gases.

Reference made hereinafter to corn will be understood to be merely by way of exemplification, since the procedure is applicable similarly to rice, soy beans, sorghum grain, wheat, oats, barley, and the like.

In practicing my process, I first wet all surfaces of all kernels of the grain to be dehydrated. I previously supposed that it was necessary to limit to a very short period the exposure of the grain to water. I find, however, that regardless of any reasonable period of exposure there is practically no penetration of water inwardly into the grain. In equipment devised for the practice of this method, the time elapsing between the wetting step and the exposure to the dehydrating gas is not at all critical. In practice it may be anywhere from a fraction of a minute to several minutes.

When the previously wet kernels of grain are exposed to dehydrating gases at high temperature, the moisture evaporates from the skin to keep the individual kernels cool. Before the artificially applied external moisture is gone, the flow of moisture from the kernel has commenced. As the internal moisture replaces the artificially applied moisture on the skin, it keeps the skin soft, porous and reasonably cool so that dehydration of the kernel proceeds without checking or cracking or loss of starch.

Since the whole purpose of the invention is to preserve the whole grain for subsequent milling, feeding or other use, the material is withdrawn from the dehydrating hot gas before heat damage occurs. The temperature of the kernels themselves never reaches a cooking temperature.

The extent to which the dehydration will be continued may depend partly upon the immediate use to be made of the grain. If the grain is to be marketed, it is sufficient that the moisture be reduced to around fifteen to sixteen percent moisture provided the grain kernels are no more than 10 degrees F. above ambient temperature.

To reduce the grain temperature from perhaps 130 degrees F. to a temperature only ten degrees above ambient, it is very desirable that the grain be passed through a cooler. In practice, it is found that additional dehydration occurs in the cooler for the reason that some of the moisture remaining in the grain has been forced by the dehydrating operation to a position immediately beneath the surface of the kernel whence it is readily evaporated merely upon exposure to moving air. Consequently, allowance is made for additional loss of moisture in the cooler down to a value which is lower by one or one and one-half or two percentage points than the percentage of moisture in the corn at the time it issues from the dehydrator.

It is found, moreover, that the cooling should not be too abrupt because, if the surfaces of the kernels are exposed to cool air abruptly upon discharge of the grain from the dehydrator, undesirable case-hardening occurs. This prevents the escape of the moisture above referred to as lying immediately beneath the surface of the kernel. It also tends to cause undue stresses which result in checks and cracks. Thus, the cooling is preferably practiced by transferring the grain from the dehydrating drum to another drum in which it is subjected to a counterflow of cooling air. The counterflow air becomes warmed progressively as it cools the grain so that the incoming grain is exposed to the warmest air rather than the coolest air, thus avoiding case-hardening, checking and cracking.

It will be understood that for prolonged storage of grain as, for example, winter storage, the percentage of remaining moisture should be thirteen to fourteen percent. This can readily be accomplished in the dehydrator, preferably allowing for withdrawal of the last one and one-half percent of moisture in the cooling operation which follows. Grain at thirteen to fourteen percent moisture and remaining raw and uncooked may be stored dry in bins or the like for any reasonable time. It is common to hold grain for a year at this moisture content.

A temperature of no more than ten degrees above ambient is the temperature specified in the trade and has nothing directly to do with the practice of the present invention since, by the method herein disclosed, I am able to effect any desired reduction of moisture and any desired approach to ambient temperature.

In the drawings:

FIG. 1 is a diagrammatic plan view of apparatus which may be employed for the practice of the invention.

FIG. 2 is a view of this apparatus in side elevation, with portions broken away.

FIG. 3 is an enlarged view taken in the plane indicated at 3—3 in FIG. 1.

FIG. 4 is a fragmentary detail view taken in section on the line 4—4 of FIG. 3.

FIG. 5 is a fragmentary detail view on an enlarged scale taken in section on the line 5—5 of FIG. 1.

FIG. 6 is a detail view on an enlarged scale taken on the line 6—6 of FIG. 1.

While the specific construction of the dehydrating drum 10 and the cooling drum 12 is not critical, it is preferred that each of these drums comprises a rotatably mounted single pass drum preferably divided into segments, as by the quartering partitions 14 shown in FIG. 6, flights 16 being provided both on the interior of the drum and on the side surfaces of the quartering partitions. Flights 16 are generally parallel on the axis of the drum for the greater portion of the length thereof but they are increased in pitch at the admission end 18 in the drum, as shown by the flights 20 in FIG. 2. The quartering partitions desirably terminate approximately at that point of the drum where the flights 16 end and the flights 20 have increased pitch.

The drums 10 and 12 have a slight inclination toward their respective discharge ends. The amount of inclination will depend a great deal upon the rate of gas flow and upon the product being handled and upon the weight of such material. A lightweight grain will be affected more by the air current through the drum than will a heavy grain such as corn. In the dehydrating drum 10 the dehydrating gas is moving with the grain to be dried. Hence its effect on the grain may be to tend to advance the grain more rapidly through the drum than would be the result of the drum pitch only. A light grain such as oats or barley will be more susceptible to advance by the gas current than a heavy grain such as corn. In the cooling drum 12, on the other hand, the flow of gas is counter-current to the movement of the grain for reasons above explained. In this instance, any effect of the gas tends to retard rather than to accelerate the advance of the grain through the drum.

In both instances, the drum will not normally be given a pitch of less than one degree or more than four degrees, three degrees being about average. The pitch affects the length of dwell of the grain in the drum and is predetermined to give the result desired.

The respective drums are desirably driven by their own individual motors shown at 22 and 24, respectively.

A head 26 at the inlet end of the dehydrator drum 10 and a head 28 at the outlet end of drum 10 are both stationary. Air enters the head 26 through a throat 30 where it mingles with the product of combustion of burner 32. The resulting dehydrating gas is a mixture of air and flue gas. It is sucked through the drum 10 by means of a blower 34 which withdraws such gas through a cyclone separator 36 connected by pipe 38 with the head 28 at the discharge end of the drum.

The temperature of the dehydrating gas is regulated to give desired dehydration of the grain in relation to the nature of the grain, the rate at which it is fed, and the dwell in drum 10. The particular temperature, therefore, is not critical to the invention. Gas temperature of about 1000 degrees F. at throat 30 is normally satisfactory.

The grain to be dehydrated is introduced in any controlled manner as by a conveyor. It can be fed by hand but I preferably use a feed screw 40 in a feed tube 42 which opens through the stationary head 26 at the inlet of drum 10. As will be explained, the rate of operation of the feed screw or other conveyor can be varied to secure the most uniform results. As shown, the grain is supplied to the feed screw by hopper 44 which opens into the screw conveyor 40.

Regardless of what type of feed conveyor is employed, a very important part of the invention consists of the arrangement whereby the grain to be dehydrated has its surface thoroughly wet. As a means of accomplishing this result, I have shown diagrammatically a series of spray nozzles 46 mounted on a housing 48 which opens into the conveyor tube 42. These nozzles are supplied with water by a header 50. Whatever the arrangement, it should be such that all surfaces of the grain are exposed to water before the grain enters the dehydrator. Once more using corn as an example, it has been found that the amount of water needed is approximately two pounds per bushel of corn regardless of how wet the corn may be. To avoid having either an excess or deficiency of water, it is preferred that the hereinafter described arrangement for varying the speed of feed screw 40 will also vary in corresponding ratio the input of water.

At the discharge end of the grain input conveyor, there is a chute 52 which extends into the rotating input end of the dehydrating drum 10 in the region in which the high pitch flights 20 are located and in which there are no interfering divider partitions 14.

The grain now moves through the dehydrating drum at a rate which, in the case of corn, would be such that the grain will stay in the drum perhaps twenty to thirty minutes total. As above indicated, to the extent that the rate of advance of the grain is varied by the current of dehydrating gas, it may be necessary to change the rate of rotation (or the pitch) of the drum to maintain the desired dwell of the grain in the drum.

At the discharge end of the drum, the grain, even as dehydrated, is too heavy to be entrained in the currents of gas passing through the separator. A hopper 54 opens from the bottom of the stationary drum head 28 to receive the grain. It is desired to cause a slight backup of grain in this hopper to the approximate level indicated by the line 56 in FIG. 3. To this end, the conveyor screw 58 which delivers the grain to the cooling drum 12 has within the bottom of the hopper a relatively low pitched lower flight 60. A limit control at the level 56 speeds up or retards the rate of rotation of the screw 58 in order to maintain the level of grain in the hopper.

The purpose of maintaining this level is to be able to take the temperature of the grain as by means of a thermocouple 62 thrust into the hopper 54 at a level between the conveyor and the high level 56. This thermocouple measures the surface temperature of the grain as discharged from the dehydrating drum 10 because the grain, at this point, has not been allowed to dwell for a sufficient period so that its internal temperature and its surface temperature are equalized.

In accordance with the present invention, the surface temperature of shelled corn as discharged from the dehydrator is held below 150 degrees and preferably at or slightly above 140 degrees F. The example given is for corn only. Rice, for example, would be held at a somewhat lower surface temperature and other grains might be higher or lower according to their respective characteristics. It is, of course, essential in all cases that the maintained temperatures be below those in which heat damage occurs.

The degree of dehydration is maintained by having the thermocouple 62 operatively connected to the burner 32 to control the amount of heat developed thereby. Obviously the method may also be practiced by effecting manually a regulation of input temperature to give the desired degree of dehydration. It is not necessary to vary the rate of gas flow through the drum as long as the burner temperature can be controlled. For reasons of efficiency, it is preferred to keep the rate of flow of the dehydrating gas at a constant value rather than to use damper control of secondary air to regulate temperature.

While the described arrangement will accurately maintain the desired range of output surface temperatures of the dehydrated grain (and therefore its degree of dehydration) it might result in inefficient operation if the grain supplied should suddenly have less moisture content to be dehydrated. In such a case, the gas temperature (if burner 32 is automatically controlled) will tend to drop, whereas the equipment could function at increased efficiency if the burner temperature is maintained and excessive dehydration prevented by simply increasing the rate at which the material is supplied to the dehydrator. Accordingly, under these conditions, the burner operation will be maintained to hold the gas at a constant input temperature of perhaps 1000 degrees F. in the throat 30. Instead of cutting down the burner temperature, the rate of feeding grain into the machine will be accelerated either by manual or physical controls. The only limit of capacity in this regard is the capacity of the equipment as determined, for example, by the size of the drum.

The grain discharged by conveyor 58 from the dehydrator is delivered into the cooling drum 12. Instead of providing a separate fan, it is convenient that the stationary head 66 of drum 12 be connected by duct 68 to the same separator 36 which is used to remove dust from the dehydrating gases. The connection draws air through the drum 12 from an opening 70 in its stationary head 72.

The cooled grain falls into the feed hopper 74 of the discharge conveyor 76. Internally the drum 12 may be substantially identical with drum 10 except that it is preferably considerably shorter (about half as long, as shown) and, of course, is turned end for end, the entrance being at the right in FIG. 1. The counterflow of ambient air through this drum causes gradual reduction in temperature of the grain and also some additional dehydration thereof. As a result of the exposure of the grain to high temperature gases in the dehydrating drum 10, the grain still contains substantial moisture in or near the surface of each kernel and this moisture is dried and removed by the ambient air circulating across the kernels in the cooling drum 12.

Using corn as an example, it has been found that if the corn as discharged is desired to have fifteen to sixteen percent moisture, it suffices to remove the corn from the dehydrator while it still contains sixteen to seventeen percent moisture, the difference being removed in the cooling drum. Any desired degree of dehydration, for a given dwell in the drum, is controlled by the rate of feed of the grain and the input temperature of the dehydrating gas in which the grain is tumbled in the respective segments of the rotating drum. The surface temperature of the grain discharged from the dryer will then indicate accurately its remaining water content. As the water content is reduced, the rate of evaporation is reduced, and the temperature of the grain is increased.

It is, of course, important to have the initially dehydrated grain exposed to this circulating air almost immediately following delivery from the dehydrator both for the purpose of reducing the grain temperature down to whatever the industry requirements may be and for the purpose of removing moisture which has been brought into proximity to the surface of the grain. Currently, industry requirements are such that the grain as discharged should be within ten degrees F. of ambient temperature.

I claim:

1. A method of dehydrating without depreciation raw grain kernels having internal moisture, such method consisting in moistening all external surfaces of the kernels by applying water thereto, and then moving the kernels and exposing them while still moist externally to concurrent flow of a current of dehydrating gas at a temperature approximately 1000° F. and sufficiently high to progressively drive internal moisture to the surfaces of the kernels, the first effect of such gas being to evaporate external moisture applied to the kernels, and the resultant evaporating cooling effect serving to protect the kernels from depreciation until the internal moisture reaches the surface, whereupon the moisture from the interior of the kernels is evaporated by said gas and the cooling effect continues to protect the grain against depreciation, and finally separating the grain from the gas and the gas-evaporated moisture before the grain is raised by said gas to a cooking or a grain depreciating temperature.

2. A method of dehydrating grain according to claim 1 in which the grain is tumbled in said current of gas while in movement in the same direction but more slowly than said current.

3. A method of dehydrating grain according to claim 1 in which the progressive driving of internal moisture to the surfaces of grain kernels leaves some remaining portion of internal moisture proximate the surfaces at the time the grain is separated from said current, and the grain is thereafter exposed to another current of gas for evaporation of such remaining portion of internal moisture.

4. A method according to claim 3 in which said last current is a current of cooling gas and the grain is maintained therein until it is close to ambient temperature.

5. A method according to claim 4 in which said grain is tumbled in said last current and is moved countercurrent with respect thereto, whereby the gas of said last current has been partially heated before it is first contacted by the grain and excessive rate of change of kernel temperature is avoided.

6. A method according to claim 1 in which the grain contains starch and the grain is maintained at a temperature below that at which any substantial impairment of its starch content occurs.

7. A method according to claim 1 in which the grain is maintained at a temperature below 160° F.

8. A method according to claim 1 in which the grain is moistened by spraying the water thereon while the grain is being conveyed toward the dehydrating operation, the current of dehydrating gas comprising a mixture of air with products of combustion, the output surface temperature of the grain upon removal from such gas being kept constant by changing the rate of moisture evaporation in compensation for any tendency of said surface temperature to change.

9. A method according to claim 8 including increase of gas temperature at first exposure of grain thereto to compensate for decrease of output grain surface temperature.

10. A method according to claim 8 in which the temperature of the gas at first exposure of grain thereto is kept constant and the compensating change in rate of moisture evaporation is effected by varying the rate of exposure of grain to such gas.

References Cited

UNITED STATES PATENTS

| | | | |
|---|---|---|---|
| 741,436 | 10/1903 | Atwood | 34—9 |
| 1,225,212 | 5/1917 | Benjamin. | |
| 1,420,679 | 6/1922 | Beckworth et al. | 34—13 |
| 2,095,086 | 10/1937 | Slemmer | 34—129 X |
| 2,118,334 | 5/1938 | Wilson | 34—31 X |
| 2,143,505 | 1/1939 | Arnold | 34—46 X |
| 2,822,153 | 2/1958 | Arnold. | |

FREDERICK L. MATTESON, Jr., *Primary Examiner.*

D. A. TAMBURRO, *Assistant Examiner.*